(12) United States Patent
Yamano et al.

(10) Patent No.: US 7,848,029 B2
(45) Date of Patent: Dec. 7, 2010

(54) RETRACTABLE ZOOM LENS

(75) Inventors: Hiroki Yamano, Kanagawa (JP); So Miyasaka, Tokyo (JP); Kazuya Watanabe, Saitama (JP)

(73) Assignees: Sony Corporation, Tokyo (JP); Tamron Co., Ltd., Saitama-shi (JP)

( * ) Notice: Subject to any disclaimer, the term of this patent is extended or adjusted under 35 U.S.C. 154(b) by 0 days.

(21) Appl. No.: 12/389,560

(22) Filed: Feb. 20, 2009

(65) Prior Publication Data

US 2009/0251796 A1 Oct. 8, 2009

(30) Foreign Application Priority Data

Feb. 21, 2008 (JP) ............................. 2008-040151
Feb. 21, 2008 (JP) ............................. 2008-040152
Feb. 21, 2008 (JP) ............................. 2008-040153

(51) Int. Cl.
G02B 15/14 (2006.01)

(52) U.S. Cl. ...................................... 359/687; 359/676

(58) Field of Classification Search ................. 359/676, 359/683, 686, 687; 348/240.99–240.3, 335–369; 396/72–88
See application file for complete search history.

(56) References Cited

U.S. PATENT DOCUMENTS

2007/0070524 A1*  3/2007  Sato ........................... 359/691

FOREIGN PATENT DOCUMENTS

| JP | 2005-338740 A | 12/2005 |
| JP | 2006-23530 A | 1/2006 |
| JP | 2006-23531 A | 1/2006 |
| JP | 2006-171055 A | 6/2006 |
| JP | 2006-308649 A | 11/2006 |
| JP | 2006-330657 A | 12/2006 |

\* cited by examiner

*Primary Examiner*—Darryl J Collins
(74) *Attorney, Agent, or Firm*—Foley & Lardner LLP

(57) ABSTRACT

A retractable zoom lens includes sequentially from an object side, a first lens group having positive refractive power, a second lens group having negative refractive power, a third lens group having positive refractive power, and a fourth lens group having positive refractive power. The third lens group includes sequentially from the object side, a first lens that is a positive lens, a second lens that is a positive lens, and a third lens that is a negative lens. The retractable zoom lens performs variable magnification by independently moving the respective lens groups along the optical axis. Further, the retractable zoom lens satisfies given conditions and maintains high optical performance while enabling a wider angle and a reduction of overall length.

19 Claims, 4 Drawing Sheets

RETRACTABLE ZOOM LENS

BACKGROUND OF THE INVENTION

1. Field of the Invention

The present invention relates to a retractable lens capable of a high variable magnification.

2. Description of the Related Art

Recently, there has been demand for further size reductions of compact devices that capture images, such as digital still cameras and home video cameras. In response to this demand, the length of lens systems mounted on compact image capturing devices has been reduced. In particular, lens systems mounted on digital still cameras, in addition to having a reduced length, are given wider angles and improved performance to accommodate higher pixilation of imaging devices (see, for example, Japanese Patent Application Laid-Open Publication Nos. 2005-338740, 2006-023530, 2006-023531, 2006-171055, and 2006-308649).

To implement shorter lens systems, especially, a zoom lens at the time of retraction (the most shortened state of a zoom lens, i.e., the state of a zoom lens at the time of power-off of the device to which the zoom lens is mounted), the lengths of lens groups making up the zoom lens are reduced along the optical axis in addition to a reduction of the space between a first lens group and a second lens group, and the space between the second lens group and a third lens group. In conventional zoom lenses, such as those disclosed in the references cited above, vertical magnification is reduced with respect to an image plane of the space in the third lens group to meet such requirements. However, although reductions in length may be achieved, this technique is problematic in that it is difficult to widen the angle of the zoom lens.

A technique of displacing, from the optical axis, a portion of optical members making up a zoom lens at the time of retraction is effective in reducing the thickness of a zoom lens. However, although reductions in thickness may be achieved, if an optical vibration-proof function, etc., is incorporated into the zoom lens, it is difficult to widen the angle.

SUMMARY OF THE INVENTION

It is an object of the present invention to at least solve the above problems in the conventional technologies.

A retractable zoom lens according to one aspect of the present invention includes sequentially from an object side, a first lens group having positive refractive power, a second lens group having negative refractive power, a third lens group having positive refractive power, and a fourth lens group having positive refractive power. The third lens group includes sequentially from the object side, a first lens that is a positive lens, a second lens that is a positive lens, and a third lens that is a negative lens. A conditional expression, $2.5 \leq (\beta_{323W})^2 \times (\beta_{4W})^2 \leq 3.5$, is satisfied, where $\beta_{323W}$ denotes a combined imaging magnification of the second lens and the third lens of the third lens group, at a wide angle edge at an infinite object distance and $\beta_{4W}$ denotes an imaging magnification of the fourth lens group, at the wide angle edge at an infinite object distance.

The other objects, features, and advantages of the present invention are specifically set forth in or will become apparent from the following detailed description of the invention when read in conjunction with the accompanying drawings.

DETAILED DESCRIPTION OF THE PREFERRED EMBODIMENTS

Figure 1:
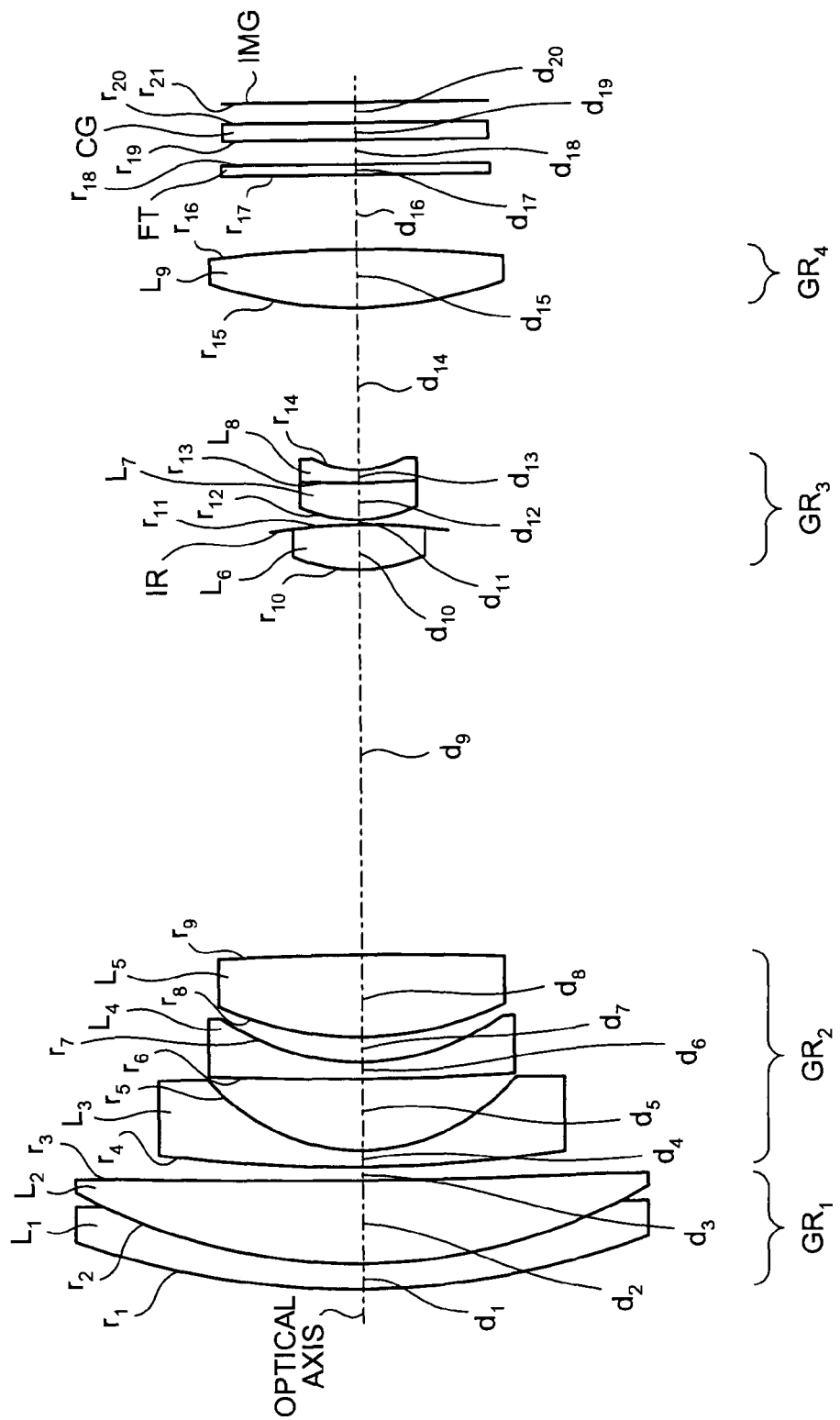
FIG. 1 is a cross-sectional view, along an optical axis, depicting a configuration of a retractable zoom lens according to an example of the present invention.

Referring to the accompanying drawings, exemplary embodiments according to the present invention are explained in detail below.

A retractable zoom lens according to an embodiment includes sequentially from an object side, a first lens group having positive refractive power, a second lens group having negative refractive power, a third lens group having positive refractive power, and a fourth lens group having positive refractive power. The third lens group includes sequentially from the object side, a first lens that is a positive lens, a second lens that is a positive lens, and a third lens that is a negative lens. The retractable zoom lens varies magnification by independently moving the first to fourth lens groups along the optical axis. Focusing is performed by moving the fourth lens group along the optical axis.

It is an object of the present invention to provide a high variable magnification retractable zoom lens capable of achieving both a wider angle and reduction of length while maintaining high optical performance even in the case of incorporating an optical vibration-proof function, etc. To achieve this object, in addition to the above configuration, the following conditions are set.

In the retractable zoom lens according to the embodiment, it is preferable to satisfy the following conditional expression when $\beta_{323W}$ is the combined imaging magnification of the second lens and the third lens included in the third lens group, at the wide angle edge at an infinite object distance and $\beta_{4W}$ is the imaging magnification of the fourth lens group, at the wide angle edge at an infinite object distance.

$$2.5 \leq (\beta_{323W})^2 \times (\beta_{4W})^2 \leq 3.5 \tag{1}$$

Conditional expression (1) is an expression that regulates vertical magnification with respect to the image plane of the space in the third lens group, at the wide angle edge of the retractable zoom lens according to the embodiment. By satisfying conditional expression (1), the retractable zoom lens can achieve a wider angle at the wide angle edge while maintaining necessary and sufficient optical performance (favorably compensating various aberrations) without an increase in the lengths of the lens groups along the optical axis. If conditional expression (1) becomes less than the lower limit, the thicknesses of the lenses making up the third lens group increase, posing a problem for reducing the overall length of the retractable zoom lens. On the other hand, if conditional expression (1) exceeds the upper limit, the travel distance of the focus group (the fourth lens group) at the time of focusing is increased to accommodate manufacturing errors, which is not preferable posing a problem for reducing the overall length of the retractable zoom lens.

In the retractable zoom lens according to the embodiment, it is preferable to satisfy the following conditional expression, where $\beta_{323T}$ denotes the combined imaging magnification of the second lens and the third lens included in the third lens group, at the telephoto edge at an infinite object distance and $\beta_{4T}$ denotes the imaging magnification of the fourth lens group, at the telephoto edge at an infinite object distance.

$$4.0 \leq (\beta_{323T})^2 \times (\beta_{4T})^2 \leq 7.0 \tag{2}$$

Conditional expression (2) is an expression that regulates vertical magnification with respect to the image plane of the space in the third lens group, at the telephoto edge of the retractable zoom lens according to the embodiment. By satisfying conditional expression (2), the retractable zoom lens can achieve a wider angle at the telephoto edge while maintaining necessary and sufficient optical performance (favorably compensating various aberrations) without an increase in the lengths of the lens groups along the optical axis. If conditional expression (2) becomes less than the lower limit, the thicknesses of the lenses making up the third lens group increase, posing a problem for reducing the overall length of the retractable zoom lens. On the other hand, if conditional expression (2) exceeds the upper limit, the travel distance of the focus group (the fourth lens group) at the time of focusing is increased to accommodate manufacturing errors, which is not preferable posing a problem for reducing the overall length of the retractable zoom lens.

The retractable zoom lens according to the embodiment is a retractable zoom lens capable of achieving both a wider angle and reductions in length while maintaining high optical performance even when an optical vibration-proof function, etc. is incorporated and is implemented by the configuration above in addition to satisfaction of conditional expression (1) or conditional expression (2). Thus, a retractable zoom lens that has high optical performance and is capable of varying a magnification up to approximately five times, or more, is implemented.

To further reduce the length of the retractable zoom lens according to the embodiment, in addition to conditional expressions (1) and (2), it is preferable to satisfy the following conditions.

It is preferable that the retractable zoom lens according to the embodiment includes a diaphragm mechanism in the space between the first lens and the second lens included in the third lens group.

This configuration eliminates the need to dispose the diaphragm mechanism on the object side of the third lens group, which is conventionally performed. Therefore, the space between the second lens group and the third lens group can be reduced at the telephoto edge and reduction of the length of the retractable zoom lens is further achieved.

Further, it is preferable that the following conditional expression is satisfied, where $LT_1$, $LT_2$, $LT_3$, and $LT_4$ denote respective lengths of the first to fourth lens groups along the optical axis; $AT_{12W}$ denotes a space along the optical axis between the first lens group and the second lens group, at the wide angle edge; $AT_{23T}$ denotes a space along the optical axis between the second lens group and the third lens group, at the telephoto edge; and DIMGMAX denotes a diameter of an imaging circle for the maximum incident light.

$$(LT_1 + LT_2 + LT_3 + LT_4 + AT_{12W} + AT_{23T})/DIMG_{MAX} \leq 2.5 \tag{3}$$

Conditional expression (3) is an expression representative of the condition for reducing the length of the retractable zoom lens along the optical axis at the time of retraction. The reduction of the length at the time of retraction can be achieved by satisfying conditional expression (3). If any one of $LT_1$, $LT_2$, $LT_3$, $LT_4$, $AT_{12W}$, and $AT_{23T}$ of conditional expression (3) increases and exceeds the upper limit of conditional expression (3), the length along the optical axis at the time of retraction increases and the length is not sufficiently reduced.

In the retractable zoom lens according to the embodiment, it is preferable to satisfy the following conditional expression where $MO_2$ denotes travel distance of the second lens group along the optical axis when magnification is varied from the wide angle edge to the telephoto edge and, $f_W$ and $f_T$ denote focal distances at the wide angle edge and the telephoto edge, respectively, of the entire system, at an infinite object distance.

$$|MO_2|/(f_T/f_W) \leq 0.5 \tag{4}$$

Conditional expression (4) is an expression representative of the condition for maintaining a balance between the length of the entire system at the wide angle edge and the length of the entire system at the telephoto edge of the retractable zoom lens according to the embodiment. Satisfaction of conditional expression (4) enables reduction of the length of the retractable zoom lens while maintaining the balance between the length of the entire system at the wide angle edge and the length of the entire system at the telephoto edge of the retractable zoom lens. If conditional expression (4) exceeds the upper limit, the balance between the length of the entire system at the wide angle edge and the length of the entire system at the telephoto edge of the retractable zoom lens is lost, which makes reductions in length difficult.

For example, if the value of $|MO_2|$ is increased and the upper limit of conditional expression (4) is exceeded since the position of the second lens group at the wide angle edge is moved toward the object side more than the position at the telephoto edge, a problem is posed for reducing length because the length of the entire system at the wide angle edge is increased although the length of the entire system at the telephoto edge is reduced. On the other hand, if the value of $|MO_2|$ is increased and the upper limit of the conditional expression (4) is exceeded since the position of the second lens group at the telephoto edge is moved toward the object side more than the position at the wide angle edge, a problem is posed for reducing length because the length of the entire system at the telephoto edge is increased although the length of the entire system at the wide angle edge is reduced, which is not preferable.

In the retractable zoom lens according to the embodiment, it is preferable to satisfy the following conditional expression, where $AT_{23W}$ denotes a space along the optical axis between the second lens group and the third lens group, at the wide angle edge and $AT_{23T}$ denotes a space along the optical axis between the second lens group and the third lens group, at the telephoto edge.

$$AT_{23T}/AT_{23W} \leq 0.04 \tag{5}$$

Conditional expression (5) is an expression that regulates the space along the optical axis between the second lens group and the third lens group. Reduction of the length of the retractable zoom lens is facilitated by satisfying conditional expression (5). If the conditional expression (5) exceeds the upper limit, the space increases between the second lens group and the third lens group of the retractable zoom lens and reduction of the length is inhibited, which is not preferable.

FIG. 1 is a cross-sectional view, along the optical axis, depicting a configuration of the retractable zoom lens according to an example of the present invention. The retractable zoom lens includes sequentially from the object side (object not depicted), a first lens group $GR_1$ having positive refractive power, a second lens group $GR_2$ having negative refractive power, a third lens group $GR_3$ having positive refractive power, and a fourth lens group $GR_4$ having positive refractive power. A filter FT includes an infrared cut filter, a low-pass filter, etc., and a cover glass CG of an imaging device, respectively disposed between the fourth lens group $GR_4$ and an image plane IMG. The filter FT and the cover glass CG are disposed as needed and may be omitted if not needed. The light receiving surface of an imaging element such as a charge-coupled device (CCD) and complementary metal-oxide-semiconductor (CMOS) is disposed on the image plane IMG.

The first lens group $GR_1$ includes sequentially from the object side, a negative lens $L_1$ and a positive lens $L_2$. The negative lens $L_1$ and the positive lens $L_2$ are cemented.

The second lens group $GR_2$ includes sequentially from the object side, a negative lens $L_3$, a negative lens $L_4$, and a positive lens $L_5$. An aspheric surface is formed on both faces of the positive lens $L_5$.

The third lens group $GR_3$ includes sequentially from the object side, a positive lens $L_6$ (first lens), a positive lens $L_7$ (second lens), and a negative lens $L_8$ (third lens). The positive lens $L_7$ and the negative lens $L_8$ are cemented. An aspheric surface is formed on both faces of the positive lens $L_6$. A diaphragm IR is provided on a face of the positive lens $L_6$, a face facing the image plane IMG.

The fourth lens group $GR_4$ includes a positive lens $L_9$. An aspheric surface is formed on both faces of the positive lens $L_9$.

The retractable zoom lens varies magnification by independently moving the first lens group $GR_1$, the second lens group $GR_2$, the third lens group $GR_3$, and the fourth lens group $GR_4$ along the optical axis. When mounted on an image capturing device, the retractable zoom lens is configured to be retractable at the time of the power-off of the device by reducing the spaces between the lens groups to the least amount of space for varying magnification, or less. The fourth lens group $GR_4$ is moved along the optical axis to perform focusing.

Although an aspheric surface is formed on both faces of the positive lens $L_5$ included in the second lens group $GR_2$ in this example, an aspheric surface may not necessarily be formed depending on required field angle and variable magnification ratio. Although the negative lens $L_3$ and the negative lens $L_4$ are spherical lenses, it is effective to use aspheric lenses if more variable magnification or wider angle is needed.

Various numeric data for the retractable zoom lens according to the example will hereinafter be described.

Focal distance at the wide angle edge (fw)=5.14 mm
Focal distance at the intermediate position (f)=11.29 mm
Focal distance at the telephoto edge ($f_T$)=24.73 mm
F-number (Fno.)=3.30 (wide angle edge) to 4.08 (intermediate position) to 5.37 (telephoto edge)
Half field angle (ω)=38.7° (wide angle edge) to 18.5° (intermediate position) to 8.72° (telephoto edge)

(Numeric Value for conditional expression (1))

$$(\beta_{323W})^2 \times (\beta_{4W})^2 = 3.183$$

(Numeric Value for conditional expression (2))

$$(\beta_{323T})^2 \times (\beta_{4T})^2 = 5.975$$

(Numeric Value for conditional expression (3))

$$(LT_1+LT_2+LT_3+LT_4+AT_{12W}+AT_{23T})/DIMG_{MAX}=1.926$$

(Numeric Value for conditional expression (4))

$$|MO_2|/(f_T f_W)=0.186$$

(Numeric Value for conditional expression (5))

$$AT_{23T}/AT_{23W}=0.026$$

$r_1$=25.214 $d_1$=0.750 $n_{d1}$=1.93323 $v_{d1}$=20.7
$r_2$=17.558 $d_2$=2.431 $n_{d2}$=1.80831 $v_{d2}$=46.3
$r_3$=197.551 $d_3$=0.400 (wide angle edge) to 7.161 (intermediate position) to 13.871 (telephoto edge)
$r_4$=44.756 $d_4$=0.500 nd3=1.80831 $v_{d3}$=46.3
$r_5$=6.095 $d_5$=2.063
$r_6$=87.125 $d_6$=0.500 $n_{d4}$=1.88815 $v_{d4}$=40.6
$r_7$=7.335 $d_7$=0.723
$r_8$=9.758 (aspheric surface) $d_8$=2.417 $n_{d5}$=1.82918 $v_{d5}$=23.9
$r_9$=5.052×10$^5$ (aspheric surface) $d_9$=11.387 (wide angle edge) to 3.932 (intermediate position) to 0.300 (telephoto edge)
$r_{10}$=4.908 (aspheric surface) $d_{10}$=1.321 $n_{d6}$=1.69661 $v_{d6}$=53.0
$r_{11}$=−17.101 (aspheric surface) $d_{11}$=0.150
$r_{12}$=4.086 $d_{12}$=1.091 $n_{d7}$=1.49845 $v_{d7}$=81.2
$r_{13}$=28.986 $d_{13}$=0.400 $n_{d8}$=1.91048 $v_{d8}$=31.1
$r_{14}$=2.942 $d_{14}$=4.777 (wide angle edge) to 6.059 (intermediate position) to 12.100 (telephoto edge)
$r_{15}$=12.855 (aspheric surface) $d_{15}$=1.706 $n_{d9}$=1.59412 $v_{d9}$=66.8
$r_{16}$=−38.524 (aspheric surface) $d_{16}$=2.187 (wide angle edge) to 4.442 (intermediate position) to 5.057 (telephoto edge)
$r_{17}$=∞ $d_{17}$=0.330 $nd_{10}$=1.51872 $vd_{10}$=64.0
$r_{18}$=∞ $d_{18}$=00.690
$r_{19}$∞ $d_{19}$=0.500 $n_{d11}$=1.51872 $vU_{d11}$=64.0
$r_{20}$=∞ $d_{20}$=0.600
$r_{21}$=∞ (image plane)

Korenich constant (K) and aspheric surface coefficient (A, B, C, D)

(eighth plane)
K=5.18670×10$^{-2}$,
A=−8.52936×10$^{-5}$, B=−1.58620×10$^{-5}$,
C=1.18099×10$^{-6}$, D=−2.61136×10$^{-8}$ (ninth plane)
K=0,
A=−2.62703×10$^{-4}$, B=−1.42954×10$^{-5}$,
C=1.16250×10$^{-5}$, D=−3.24788×10$^{-8}$ (tenth plane)
K=0,
A=−7.60897×10$^{-4}$, B=−2.24476×10$^{-4}$,
C=4.92808×10$^{-5}$, D=−6.95411×10$^{-6}$ (eleventh plane)
K=0,
A=5.82435×10$^{-4}$, B=−3.41641×10$^{-4}$,
C=8.54948×10$^{-5}$, D=−1.09402×10$^{-5}$ (fifteenth plane)
K=0,
A=−3.81066×10$^{-4}$, B=7.08912×10$^{-5}$,
C=−5.38903×10$^{-5}$, D=1.36319×10$^{-7}$ (sixteenth plane)
K=0,
A=−3.28899×10$^{-4}$, B=7.80046×10$^{-5}$,
C=−5.93756×10$^{-5}$, D=1.47937×10$^{-7}$ In the numeric data above, $r_1$, $r_2$, etc., denote curvature radiuses of the diaphragm surface, etc.; $d_1$, $d_2$ etc., denote thicknesses of the lenses, diaphragm, optical filters, etc., or surface intervals thereof; $n_{d1}$, $n_{d2}$, etc., denote refractive indexes on the d-line of the lenses, optical filters, etc.; and $v_{d1}$, $v_{d2}$, etc., denote Abbe number on the d-line of the lenses, optical filters, etc.

The aspheric shapes are represented by the following equation where Z denotes sag of a plane parallel to the optical axis; h denotes a height from the optical axis; and the light traveling direction is positive.

$$Z = \frac{ch^2}{1 + \sqrt{1 - (1+K)c^2h^2}} + Ah^4 + Bh^6 + Ch^8 + Dh^{10} \quad [1]$$

Further, c denotes a curvature (=1/r) at the plane apex; K denotes the Korenich constant; A, B, C, and D denote fourth-, sixth-, eighth-, and tenth-order aspheric coefficients, respectively.

Figure 2:
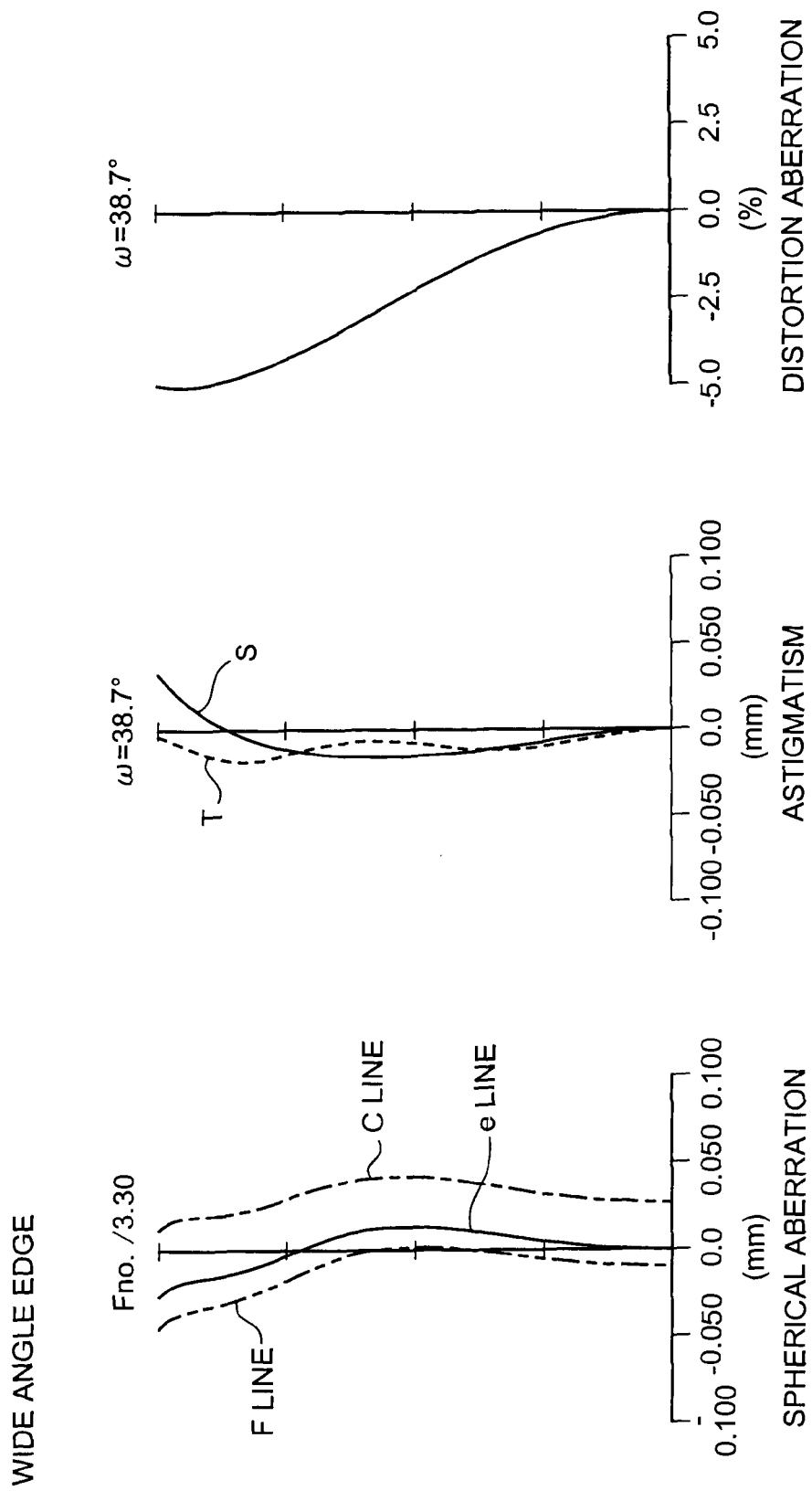
FIG. 2 is a diagram depicting various aberrations at a wide angle edge of the retractable zoom lens.
Figure 3:
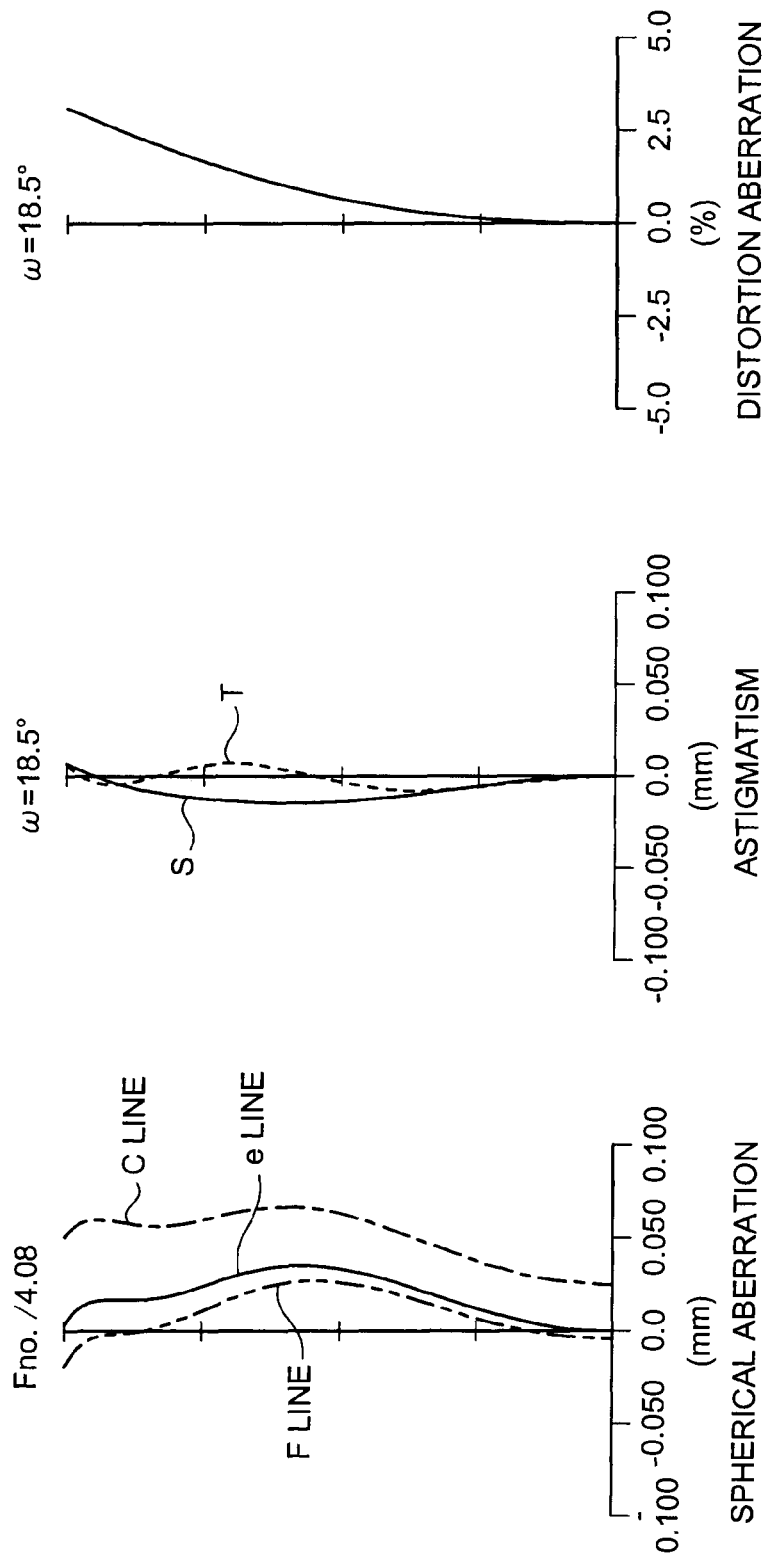
FIG. 3 is a diagram depicting various aberrations at an intermediate position of the retractable zoom lens.
Figure 4:
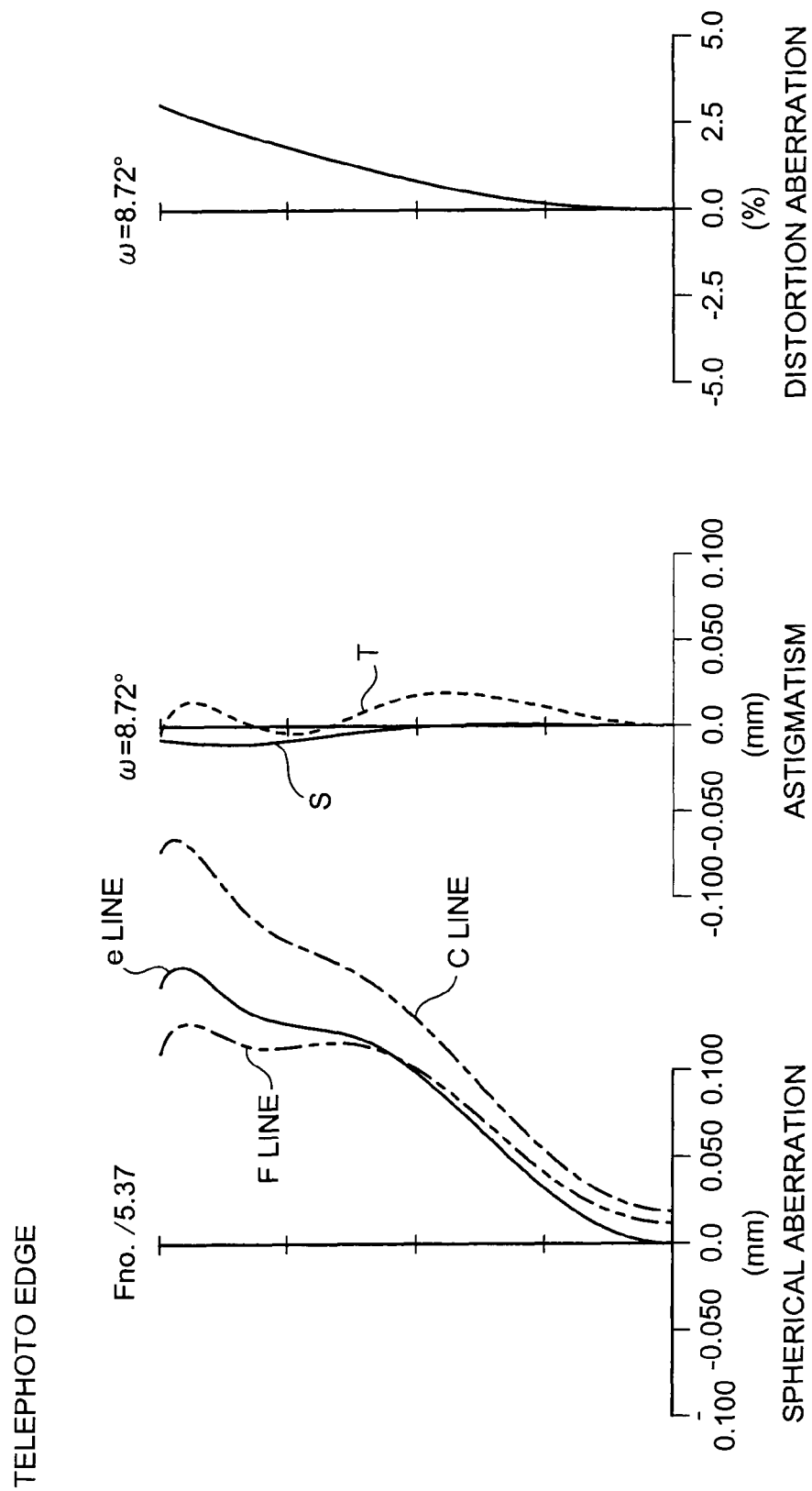
FIG. 4 is a diagram depicting various aberrations at a telephoto edge of the retractable zoom lens.

FIG. 2 is a diagram depicting various aberrations at the wide angle edge of the retractable zoom lens according to the example of the present invention. FIG. 3 is a diagram depicting various aberrations at the intermediate position of the retractable zoom lens according to the example of the present invention. FIG. 4 is a diagram depicting various aberrations at the telephoto edge of the retractable zoom lens according to the example of the present invention.

As described above, the present invention can provide a retractable zoom lens that has high variable magnification (approximately five times) and is capable of achieving both a wider angle and reduced length while maintaining high optical performance even when an optical vibration-proof function, etc. is incorporated The retractable zoom lens can achieve reductions in length (especially, when retracted) and a wider angle as well as favorable aberration correction by satisfying predetermined conditions.

Since the retractable zoom lens according to the present invention includes lenses forming aspheric surfaces, various aberrations can be corrected favorably with a small number of lenses.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

The present document incorporates by reference the entire contents of Japanese priority document, 2008-040151, 2008-040152 and 2008-040153 filed in Japan on Feb. 21, 2008.

What is claimed is:

1. A retractable zoom lens that includes sequentially from an object side, a first lens group having positive refractive power, a second lens group having negative refractive power, a third lens group having positive refractive power, and a fourth lens group having positive refractive power, wherein
   the third lens group comprises sequentially from the object side, a first lens that is a positive lens, a second lens that is a positive lens, and a third lens that is a negative lens,
   a conditional expression, $2.5 \leq (\beta_{323W})^2 \times (\beta_{4W})^2 \leq 3.5$, is satisfied, where $\beta_{323W}$ denotes a combined imaging magnification of the second lens and the third lens of the third lens group, at a wide angle edge at an infinite object distance and $\beta_{4W}$ denotes an imaging magnification of the fourth lens group, at the wide angle edge at an infinite object distance.

2. The retractable zoom lens according to claim 1, further comprising a diaphragm unit in a space between the first lens and the second lens of the third lens group.

3. The retractable zoom lens according to claim 1, wherein a conditional expression, $(LT_1+LT_2+LT_3+LT_4+AT_{12W}+AT_{23T})/DIMG_{MAX} \leq 2.5$, is satisfied, where $LT_1$, $LT_2$, $LT_3$, and $LT_4$ denote respective lengths of the first to fourth lens groups, the lengths being along an optical axis; $AT_{12W}$ denotes a space along the optical axis between the first lens group and the second lens group, at the wide angle edge; $AT_{23T}$ denotes a space along the optical axis between the second lens group and the third lens group, at a telephoto edge; and $DIMG_{MAX}$ denotes a diameter of an imaging circle for the maximum incident light.

4. The retractable zoom lens according to claim 1, wherein a conditional expression, $|MO_2|/(f_T/f_W) \leq 0.5$, is satisfied, where $MO_2$ denotes a travel distance of the second lens group along an optical axis when magnification is varied from the wide angle edge to a telephoto edge and, $f_W$ and $f_T$ denote respective focal distances at the wide angle edge and the telephoto edge of the retractable zoom lens, at an infinite object distance.

5. The retractable zoom lens according to claim 1, wherein a conditional expression, $AT_{23T}/AT_{23W} \leq 0.04$, is satisfied, where $AT_{23W}$ denotes a space along an optical axis between the second lens group and the third lens group, at the wide angle edge and $AT_{23T}$ denotes a space along the optical axis between the second lens group and the third lens group, at a telephoto edge.

6. A retractable zoom lens that includes sequentially from an object side, a first lens group having positive refractive power, a second lens group having negative refractive power, a third lens group having positive refractive power, and a fourth lens group having positive refractive power, wherein
   the third lens group comprises sequentially from the object side, a first lens that is a positive lens, a second lens that is a positive lens, and a third lens that is a negative lens,
   a conditional expression, $4.0 \leq (\beta_{323T})^2 \times (\beta_{4T})^2 \leq 7.0$, is satisfied, where $\beta_{323T}$ denotes a combined imaging magnification of the second lens and the third lens of the third lens group, at a telephoto edge at an infinite object distance and $\beta_{4T}$ denotes an imaging magnification of the fourth lens group, at the telephoto edge at an infinite object distance.

7. The retractable zoom lens according to claim 6, further comprising a diaphragm unit in a space between then first lens and the second lens of the third lens group.

8. The retractable zoom lens according to claim 6, wherein a conditional expression, $(LT_1+LT_2+LT_3+LT_4+AT_{12W}+AT_{23T})/DIMG_{MAX} \leq 2.5$, is satisfied, where $LT_1$, $LT_2$, $LT_3$, and $LT_4$ denote respective lengths of the first to fourth lens groups, the lengths being along an optical axis; $AT_{12W}$ denotes a space along the optical axis between the first lens group and the second lens group, at a wide angle edge; $AT_{23T}$ denotes a space along the optical axis between the second lens group and the third lens group, at the telephoto edge; and $DIMG_{MAX}$ denotes a diameter of an imaging circle for the maximum incident light.

9. The retractable zoom lens according to claim 6, wherein a conditional expression, $|MO_2|/(f_T/f_W) \leq 0.5$, is satisfied, where $MO_2$ denotes a travel distance of the second lens group along an optical axis when magnification is varied from a wide angle edge to the telephoto edge and, $f_W$ and $f_T$ denote respective focal distances at the wide angle edge and the telephoto edge of the retractable zoom lens, at an infinite object distance.

10. The retractable zoom lens according to claim 6, wherein a conditional expression, $AT_{23T}/AT_{23W} \leq 0.04$, is satisfied, where $AT_{23W}$ denotes a space along an optical axis between the second lens group and the third lens group, at a wide angle edge and $AT_{23T}$ denotes a space along the optical axis between the second lens group and the third lens group, at the telephoto edge.

11. A retractable zoom lens that includes sequentially from an object side, a first lens group having positive refractive power, a second lens group having negative refractive power, a third lens group having positive refractive power, and a fourth lens group having positive refractive power, wherein
the third lens group comprises sequentially from the object side, a first lens that is a positive lens, a second lens that is a positive lens, and a third lens that is a negative lens, conditional expressions, $2.5 \leq (\beta_{323W})^2 \times (\beta_{4W})^2 \leq 3.5$ and $4.0 \leq (\beta_{323T})^2 \times (\beta_{4T})^2 \leq 7.0$, are satisfied, where $\beta_{323W}$ denotes a combined imaging magnification of the second lens and the third lens of the third lens group, at a wide angle edge at an infinite object distance; $\beta_{323T}$ denotes a combined imaging magnification of the second lens and the third lens of the third lens group, at a telephoto edge at an infinite object distance; $\beta_{4W}$ denotes an imaging magnification of the fourth lens group, at the wide angle edge at an infinite object distance; and $\beta_{4T}$ denotes an imaging magnification of the fourth lens group, at the telephoto edge at an infinite object distance.

12. The retractable zoom lens according to claim 11, further comprising a diaphragm unit in a space between the first lens and the second lens of the third lens group.

13. The retractable zoom lens according to claim 11, wherein a conditional expression, $(LT_1+LT_2+LT_3+LT_4+AT_{12W}+AT_{23T})/DIMG_{MAX} \leq 2.5$, is satisfied, where $LT_1$, $LT_2$, $LT_3$, and $LT_4$ denote respective lengths of the first to fourth lens groups, the lengths being along an optical axis; $AT_{12W}$ denotes a space along the optical axis between the first lens group and the second lens group, at the wide angle edge; $AT_{23T}$ denotes a space along the optical axis between the second lens group and the third lens group, at the telephoto edge; and $DIMG_{MAX}$ denotes a diameter of an imaging circle for the maximum incident light.

14. The retractable zoom lens according to claim 11, wherein a conditional expression, $|MO_2|/(f_T/f_W) \leq 0.5$, is satisfied, where $MO_2$ denotes a travel distance of the second lens group along an optical axis when magnification is varied from the wide angle edge to the telephoto edge and, $f_W$ and $f_T$ denote respective focal distances at the wide angle edge and the telephoto edge of the retractable zoom lens, at an infinite object distance.

15. The retractable zoom lens according to claim 11, wherein a conditional expression, $AT_{23T}/AT_{23W} \leq 0.04$, is satisfied, where $AT_{23W}$ denotes a space along an optical axis between the second lens group and the third lens group, at the wide angle edge and $AT_{23T}$ denotes a space along the optical axis between the second lens group and the third lens group, at the telephoto edge.

16. A retractable zoom lens that includes sequentially from an object side, a first lens group having positive refractive power, a second lens group having negative refractive power, a third lens group having positive refractive power, and a fourth lens group having positive refractive power, wherein
the third lens group comprises sequentially from the object side, a first lens that is a positive lens, a second lens that is a positive lens, and a third lens that is a negative lens, and
the retractable zoom lens further comprises a diaphragm unit in a space between the first lens and the second lens of the third lens group.
wherein a conditional expression, $|MO_2|/(f_T/f_W) \leq 0.5$, is satisfied where $MO_2$ denotes a travel distance of the second lens group along an optical axis when magnification is varied from a wide angle edge to a telephoto edge and, $f_W$ and $f_T$ denote respective focal distances at the wide angle edge and the telephoto edge of the retractable zoom lens, at an infinite object distance.

17. A retractable zoom lens that includes sequentially from an object side, a first lens group having positive refractive power, a second lens group having negative refractive power, a third lens group having positive refractive power, and a fourth lens group having positive refractive power, wherein
a conditional expression, $(LT_1+LT_2+LT_3+LT_4+AT_{12W}+AT_{23T})/DIMG_{MAX} \leq 2.5$, is satisfied, where $LT_1$, $LT_2$, $LT_3$, and $LT_4$ denote respective lengths of the first to fourth lens groups, the lengths being along an optical axis; $AT_{12W}$ denotes a space along the optical axis between the first lens group and the second lens group, at a wide angle edge; $AT_{23T}$ denotes a space along the optical axis between the second lens group and the third lens group, at a telephoto edge; and $DIMG_{MAX}$ denotes a diameter of an imaging circle for the maximum incident light.

18. The retractable zoom lens according to claim 17, wherein a conditional expression, $|MO_2|/(f_T/f_W) \leq 0.5$, is satisfied where $MO_2$ denotes a travel distance of the second lens group along the optical axis when magnification is varied from the wide angle edge to the telephoto edge and, $f_W$ and $f_T$ denote respective focal distances at the wide angle edge and the telephoto edge of the retractable zoom lens, at an infinite object distance.

19. The retractable zoom lens according to claim 17, wherein a conditional expression, $AT_{23T}/AT_{23W} \leq 0.04$, is satisfied, where $AT_{23W}$ denotes a space along the optical axis between the second lens group and the third lens group, at the wide angle edge and $AT_{23T}$ denotes a space along the optical axis between the second lens group and the third lens group, at the telephoto edge.

* * * * *